No. 856,478. PATENTED JUNE 11, 1907.
S. G. LEWIS.
EVAPORATING APPARATUS.
APPLICATION FILED JULY 16, 1906.

2 SHEETS—SHEET 1.

Witnesses
E. Patton.
L. A. L. McIntyre

Inventor
Sylvester G. Lewis
by Hopkins & Hicks Attys.

No. 856,478. PATENTED JUNE 11, 1907.
S. G. LEWIS.
EVAPORATING APPARATUS.
APPLICATION FILED JULY 16, 1906.

2 SHEETS—SHEET 2.

Witnesses.
E. Patton.
L. A. L. McIntyre.

Inventor
Sylvester G. Lewis
by Hopkins & Ericks attys.

UNITED STATES PATENT OFFICE.

SYLVESTER G. LEWIS, OF ST. LOUIS, MISSOURI, ASSIGNOR TO BANANA FOOD PRODUCTS COMPANY, A CORPORATION OF ARIZONA TERRITORY.

EVAPORATING APPARATUS.

No. 856,478.  Specification of Letters Patent.  Patented June 11, 1907.

Application filed July 16, 1906. Serial No. 326,426.

*To all whom it may concern:*

Be it known that I, SYLVESTER G. LEWIS, a citizen of the United States, and a resident of St. Louis, Missouri, have invented certain new and useful Improvements in Evaporating Apparatus, of which the following is a specification.

This invention relates to improvements in an evaporating apparatus, adapted more particularly for the treatment of bananas, preparatory to converting the same into various food products, though applicable also to other similar uses.

The main object of my invention is to effect a thorough drying of the fruit, without subjecting the same to any cooking or other injurious action, with the greatest facility and economy. To accomplish this, I not only provide for an independent circulation of the drying medium in contact with each separate layer or tray of the fruit being treated, but I also provide for the more effective and satisfactory utilization of the air current by causing a portion thereof to circulate through the layers of fruit to quickly free the moisture therein, and another portion to promptly carry off the moisture so freed from the fruit, thus maintaining at all stages in the process a very low humidity within the apparatus, which condition is essential to the securing of the best results, as well as to the proper maintenance of the apparatus.

A further object of my invention is to equip this apparatus with a condenser whereby the moisture escaping from the apparatus is brought in contact with the under side of the condenser and condensed, and the condensation collected and used as a by-product.

Figures 1, 3:
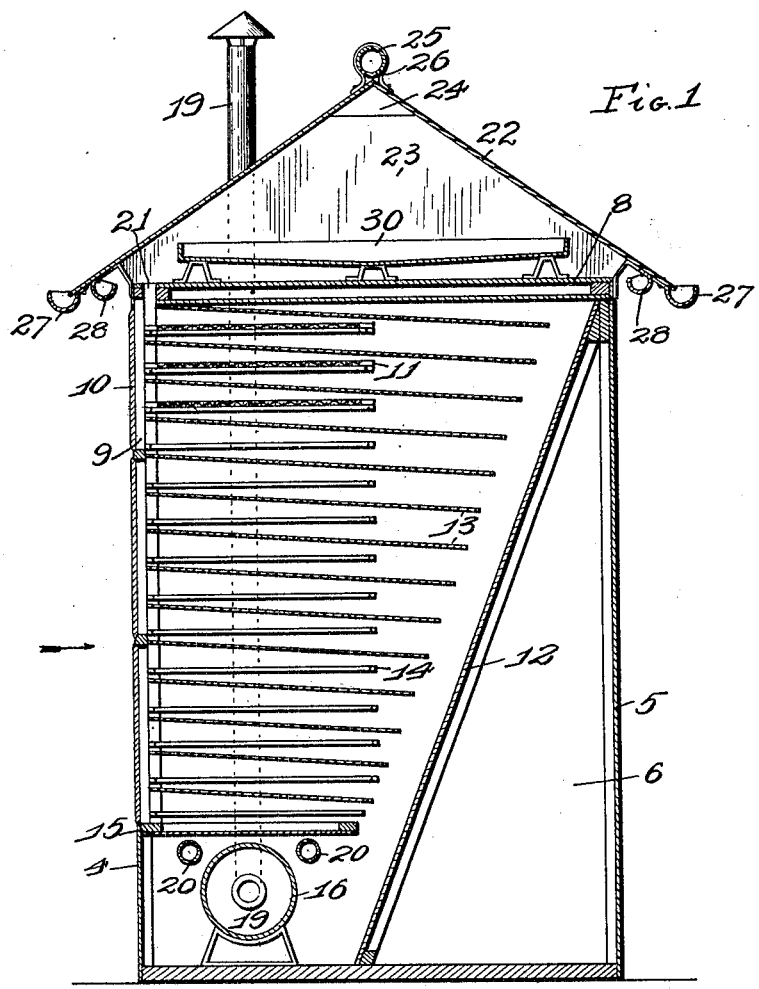
Figure 2:
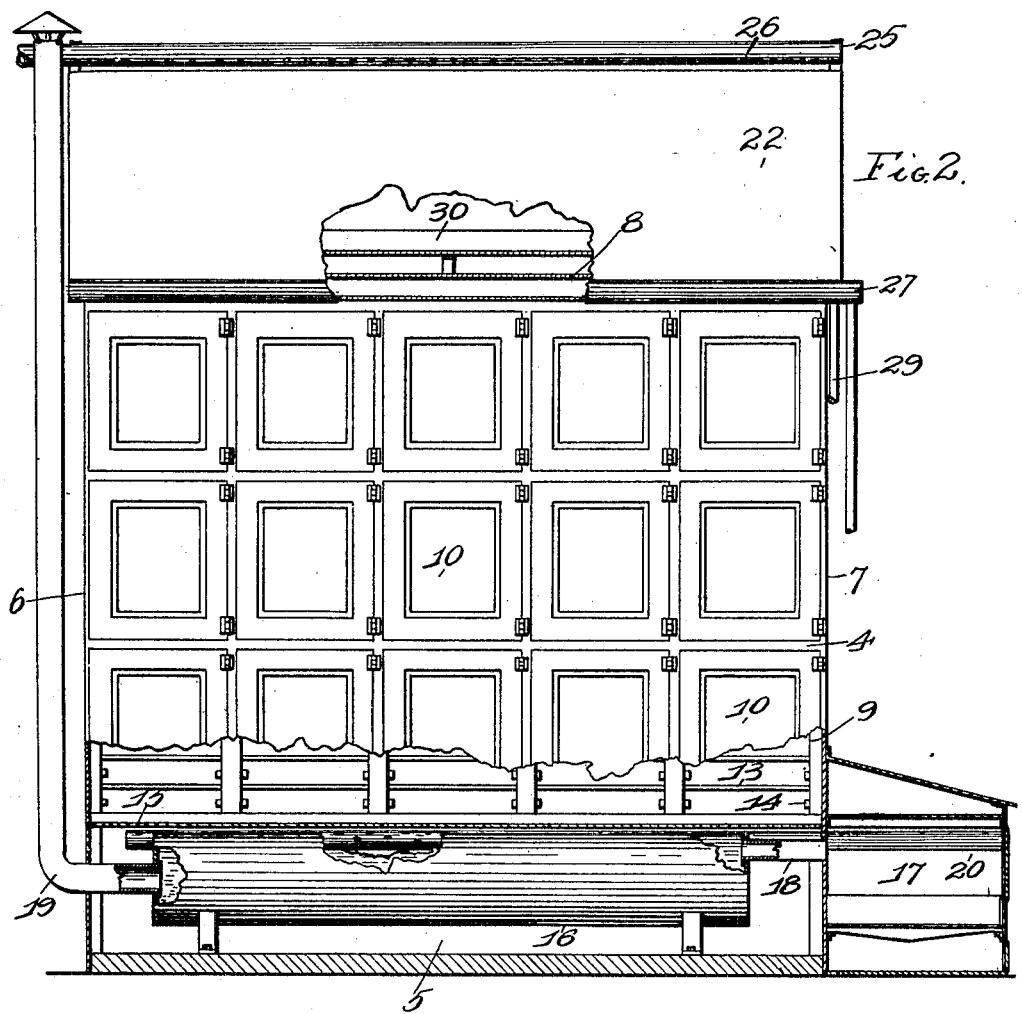

Referring to the drawings—Figure 1 is a vertical cross-sectional view of my invention taken through mid-center. Fig. 2 is a side elevation, with parts broken away showing a portion of the interior, viewing the same from the side indicated by the arrow in Fig. 1. Fig. 3 is a detail perspective view of one of the trays made use of in carrying out my invention.

In the construction of my invention, I provide a suitable housing composed of a front wall 4, a rear wall 5, end-walls 6 and 7, and a top 8. The front wall 4 is provided with a plurality of openings 9, which are covered by the doors 10, through which the trays 11 are inserted and removed into the interior of my device.

The top of my device is composed of two sections, so arranged as to allow an air-space between the same, through which air may circulate from end to end. Within the casing, I provide an inclined wall 12, which is arranged to deflect the heat upwardly, and act as a shield to deflect the heat in contact with each and every plate 13 located horizontally and slightly inclined within the device.

The plates 13 are made preferably of sheet-metal, forming between them an independent compartment. Within each compartment, I provide supporting-strips 14, upon which the trays 11 are placed and held in position. Below the lowest plate, I provide a covering 15 extending the entire length of the device, and beneath the same is mounted a heating-drum 16, which communicates with the furnace 17 by means of a connecting-pipe 18. To the opposite end of the drum 16 I provide the flue-pipe 19, which extends upwardly, and of a sufficient height to give proper draft for the furnace.

The furnace 17 is located to one side of the apparatus, and through said furnace is passed a pair of fresh air tubes 20, which lead into the apparatus above and at each side of the heating-drum, and said tubes are provided with outlets through which fresh air, after becoming heated while passing through the furnace, is admitted into the apparatus.

In the top 8, I provide an opening 21, through which the moisture and heat may pass from the apparatus, and come in contact with the under surface of an inclined roof 22, supported on walls 23 located at each end of the apparatus. A portion of the walls 23 is cut away forming the space 24 to provide proper circulation and cause sufficient draft for permitting the vapors to be expelled from the interior of the apparatus. Upon the apex of the roof, I provide a water-pipe 25, provided with a plurality of jet-holes 26, permitting a flow of water to pass over the roof, for cooling the same, and this water is caught in the troughs 27 formed at the eaves of the roof. Against the surface of the roof, I provide troughs 28, which extend along the entire length, and empty their contents through the pipe 29 into any suitable container. The object of these troughs 28 is to catch the particles of condensed vapor as they pass downwardly, and which condensation is formed by means of the heated vapor coming in contact with the chilled roof.

In case particles of the condensation should fall from the under surface of the roof, I catch the same by means of the basin 30, which is suitably supported upon the top 8 by brackets, and providing suitable air-space beneath to prevent the basin from becoming heated from the apparatus.

The operation of my invention is as follows: The bananas are placed upon the trays 11, and the trays, together with their contents, are placed upon the supports 14 within the apparatus, the heat from the drum 16 passing upwardly, and by means of each of the plates 13 projecting one beyond the other, the longest being at the top, and the shortest at the bottom, and the heat having a tendency to rise vertically, will come in contact with the projecting edge of each plate, and on account of the inclination of each plate, will cause the heat to pass through each compartment, coming in contact with the bananas upon the trays, heating and drying the same, and preventing the moisture from one tray from coming in contact with the other, and by means of the opening 21 in the top, creating sufficient draft to draw the heat, together with the vapors from the apparatus, and to permit said vapors to come in contact with the condenser.

Having thus described my invention, what I claim as new and desire to have secured to me by the grant of Letters Patent is:

1. An evaporating apparatus comprising a casing, a hot-air chamber formed within said casing, an inclined partition wall located in said casing, a plurality of plates located in the heating-chamber, the ends extending at an equal distance from the inclined partition wall, and a condenser located upon the top of the casing whereby the vapors are condensed, substantially as specified.

2. A device of the class described comprising a casing, a heating apparatus located in said casing, an inclined partition wall located in said casing, a cover located in the casing and extending over the heating device, inclined plates located in the casing, their ends projecting an equal distance from the inclined partition wall, a condenser located upon the top of the casing, the end walls of said condenser provided with openings at the apex for the circulation of air, and a basin located upon the casing beneath the condenser, substantially as specified.

In testimony whereof, I have signed my name to this specification, in presence of two subscribing witnesses.

SYLVESTER G. LEWIS.

Witnesses:
ALFRED A. EICKS,
L. A. L. McINTYRE.